United States Patent [19]
Bessler

[11] Patent Number: 5,487,277
[45] Date of Patent: Jan. 30, 1996

[54] INDEPENDENT COMPARTMENT TEMPERATURE CONTROL IN A HOUSEHOLD REFRIGERATOR USING INTERLINKED THERMOSTATS

[75] Inventor: Warren F. Bessler, Schenectady, N.Y.

[73] Assignee: General Electric Company, Schenectady, N.Y.

[21] Appl. No.: 342,291

[22] Filed: Nov. 18, 1994

[51] Int. Cl.⁶ .................................................. F25D 17/08
[52] U.S. Cl. ................................ 62/187; 62/209; 62/229
[58] Field of Search .............................. 62/186, 187, 209, 62/229; 236/49.3; 165/22

[56] References Cited

U.S. PATENT DOCUMENTS

| | | | |
|---|---|---|---|
| 2,053,945 | 9/1936 | Cowin | 62/186 X |
| 3,005,321 | 10/1961 | Devery | 62/186 |
| 3,090,209 | 5/1963 | Hubacker | 62/186 X |
| 3,107,502 | 10/1963 | Herdon, Jr. et al. | 62/186 X |
| 3,786,648 | 1/1974 | Rice | 62/200 |
| 3,893,307 | 7/1975 | Jacobs | 62/186 X |
| 4,682,474 | 7/1987 | Janke | 62/187 |
| 4,732,010 | 3/1988 | Linstromberg et al. | 62/187 |
| 4,966,010 | 10/1990 | Jaster et al. | 62/179 |
| 5,018,364 | 5/1991 | Chesnut et al. | 62/187 |
| 5,255,530 | 10/1993 | Janke | 62/180 |

*Primary Examiner*—William E. Tapoicai
*Attorney, Agent, or Firm*—Paul R. Webb, II

[57] ABSTRACT

Energy efficient independent temperature control is achieved in refrigerators by minimizing system run time. A freezer thermostat activates the refrigeration system when the freezer compartment requires cooling and a fresh food thermostat which controls a damper between the two compartments. The two thermostats are operatively connected so that the freezer thermostat is prevented from switching off whenever the fresh food thermostat calls for cooling in the fresh food compartment. Thus, only the freezer thermostat is able to activate the refrigeration system, while either of the thermostats can inactivate the system.

22 Claims, 4 Drawing Sheets

1

INDEPENDENT COMPARTMENT TEMPERATURE CONTROL IN A HOUSEHOLD REFRIGERATOR USING INTERLINKED THERMOSTATS

BACKGROUND OF THE INVENTION

This invention relates generally to refrigerator controls and more particularly to interlinked thermostats for efficiently controlling the temperatures in the refrigerator compartments.

Household refrigerators typically comprise a freezer compartment and a fresh food compartment separated by a partition. The freezer compartment is cooled by a fan circulating air over an evaporator situated in the freezer compartment. The fresh food compartment is cooled by diverting chilled air from the freezer compartment to the fresh food compartment through an air passage in the partition wall. The temperatures in the compartments gradually rise due to heat transfer through the walls and doors of the refrigerator as well as from door openings and the loading of food items therein. Various methods for controlling the temperatures of the freezer and fresh food compartments are known, but these known methods typically cause the refrigeration system to be operated whenever either compartment requires cooling. This results in frequent system operation with a corresponding expenditure of energy.

Accordingly, there is a need for an arrangement for obtaining adequate temperature stability within both food compartments of a refrigerator with minimum energy consumption.

SUMMARY OF THE INVENTION

The above-mentioned needs are met by the present invention which achieves energy efficient independent temperature control by sequencing the fresh food compartment cooling demand in phase with the freezer compartment cooling so as to minimize system run time. This is accomplished with a control comprising a freezer thermostat arranged to activate the refrigeration system when the freezer compartment requires cooling and a fresh food thermostat which controls the damper between the two compartments. The two thermostats are operatively connected so that the freezer thermostat is prevented from switching off whenever the fresh food thermostat calls for cooling in the fresh food compartment. Thus, only the freezer thermostat is able to activate the refrigeration system, while either of the thermostats can inactivate the system. The thermostats can be connected by a locking mechanism which includes a linking arm having one end attached to one of thermostats and another end situated adjacent to the other thermostat. When both thermostats are on, the linking arm will be situated to prevent the freezer thermostat from switching off until the fresh food thermostat switches off. In addition to preventing extraneous operation of the refrigeration system, this arrangement accommodates fresh food door opening transients without compressor operation and reduces ice cube fusing.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
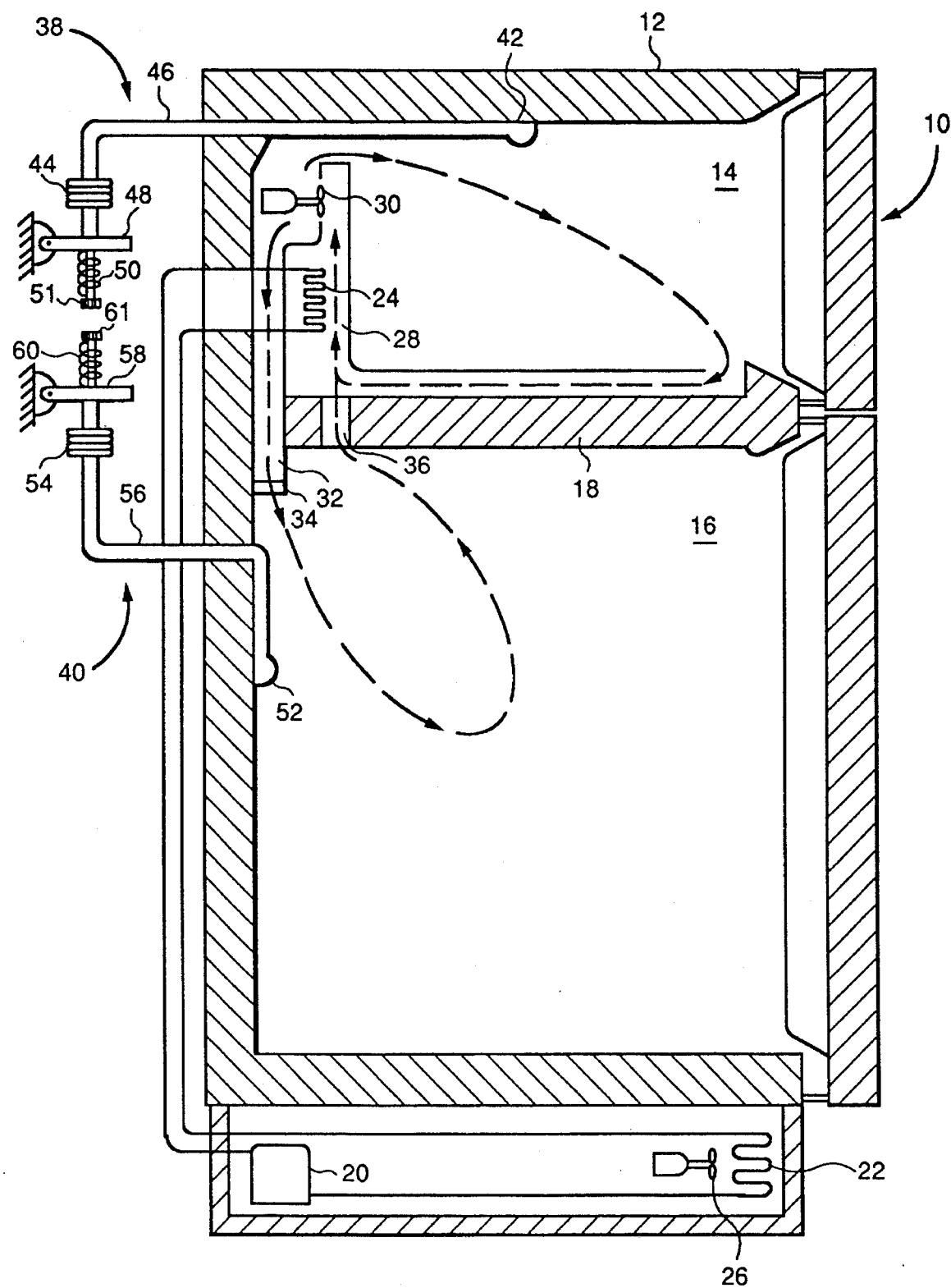
FIG. 1 is a schematic diagram showing a cross-sectional side view of a refrigerator in accordance with the present invention.

Referring to the drawings wherein identical reference numerals denote the same elements throughout the various views, FIG. 1 shows a refrigeration apparatus such as a household refrigerator 10 including the control system of the present invention. Although the refrigerator 10 shown in FIG. 1 is a top mount refrigerator, it should be noted that the present invention is equally applicable to other types of refrigerators, such as the well known side-by-side design.

The refrigerator 10 comprises an outer cabinet 12 having a freezer-compartment 14 and a fresh food compartment 16 separated by a partition wall 18. The two compartments are maintained at the desired temperature levels by a refrigeration system which comprises a compressor 20, a condenser 22 and an evaporator 24 connected in fluid communication and charged with a refrigerant. An expansion device (not shown) is connected between the condenser 22 and the evaporator 24 as is well known in the art. A condenser fan 26 is situated adjacent to the condenser 22 and causes air to flow over the condenser 22 to promote heat transfer.

The evaporator 24 is located within a chamber 28 situated in the rear of the freezer compartment 14. An evaporator fan 30 is positioned above the evaporator 24. The evaporator fan 30 draws air from the freezer compartment 14 into the chamber 28 and over the evaporator 24 and discharges cooled air into the freezer compartment 14. Some of the air cooled by the evaporator 24 is diverted through an air passage 32 into the fresh food compartment 16. A damper 34 is provided in the air passage 32 to regulate the flow of air into the fresh food compartment 16. The division of cooling air is such that the freezer compartment 14 is maintained at below freezing temperatures and the fresh food compartment 16 is maintained at food preserving temperatures. Air is returned to the chamber 28 from the fresh food compartment 16 via a return duct 36 in the partition wall 18.

The refrigerator 10 includes a freezer thermostat 38 and a fresh food thermostat 40. By way of example, the thermostats 38, 40 are shown as the expansible gas type although other types could be used. The freezer thermostat 38 has a temperature sensing element 42 located in the freezer compartment 14. The temperature sensing element 42 is typically a bulb containing a volatile fluid which is connected to an expansible bellows 44 by a capillary tube 46. The bellows 44 will thus expand and contract as the temperature in the freezer compartment 14 increases and decreases. An actuating arm 48 is arranged to move between first and second positions in response to expansion and contraction of the bellows 44. The actuating arm 48 assumes the first position as long as the temperature in the freezer compartment 14 is below a predetermined level and moves with snap action into the second position when the temperature in the freezer compartment 14 exceeds the predetermined level. The freezer thermostat 38 is electrically connected to activate the compressor 20 and evaporator fan 30 when the actuating arm 48 switches to the second position. The temperature at which the actuating arm 48 switches position (referred to herein as the "preset temperature level") may be varied by means of an adjustable spring 50.

The fresh food thermostat 40 is similar to the freezer thermostat 38 and includes a temperature sensing element 52 located in the fresh food compartment 16 which is connected to a bellows 54 by a capillary tube 56. An actuating arm 58 is controlled by the bellows 54 in response to temperature changes in the fresh food compartment 16. The actuating arm 58 assumes a first position as long as the temperature in the fresh food compartment 16 is below a preset temperature level and moves with snap action into a second position when the temperature in the fresh food compartment 16 exceeds the preset temperature level. The preset temperature level of the fresh food thermostat 40 may be varied by means of an adjustable spring 60.

The fresh food thermostat 40 also controls the opening and closing of the damper 34, where the damper 34 is closed when the actuating arm 58 is in its first position, and the damper 34 is opened when the actuating arm 58 is in its second position. The actuating arm 58 can either be mechanically linked to the damper 34 to directly manipulate the damper 34, or the actuating arm 58 can activate a motor arranged to open and close the damper 34. Although schematically shown outside of the refrigerator for ease of illustration, the thermostats 38,40 are normally contained within the refrigerator cabinet 12 with control knobs or thumb wheels 51,61 for adjusting the springs 50,60, respectively, being accessible through the fresh food compartment 16.

Figure 2:
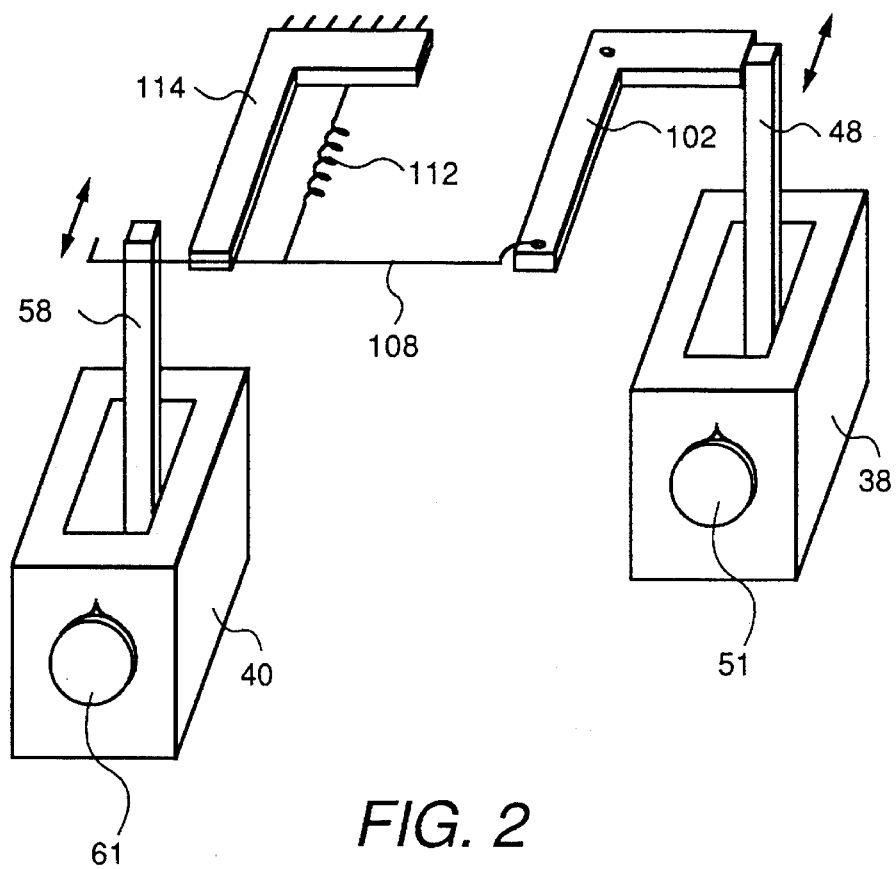
FIG. 2 shows a first embodiment of the refrigerator control in accordance with the present invention.
Figure 3:
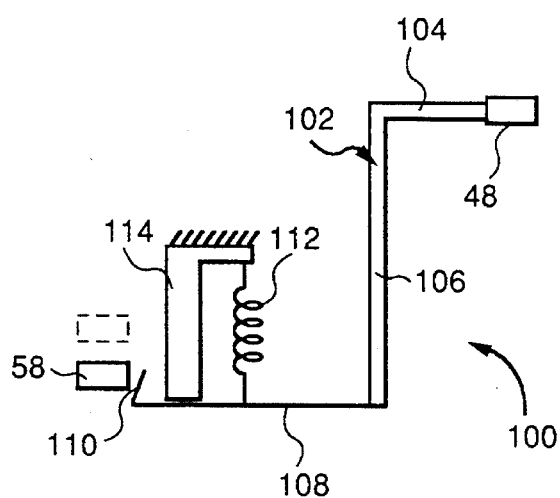
FIGS. 3 and 4 are top views of the embodiment of FIG. 2 illustrating the operation thereof.
Figure 4:
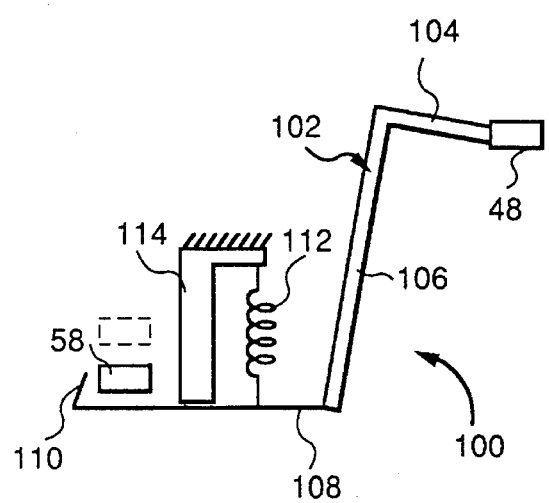

Turning now to FIGS. 2-4, a first embodiment of the refrigerator control of the present invention is shown. As seen best in FIG. 2, the freezer thermostat 38 and the fresh food thermostat 40 are arranged side-by-side with the control knobs 51,61 both facing in the same direction. The actuating arm 48 of the freezer thermostat 38 moves between the first and second positions in the direction shown by the arrows wherein its first position is towards the back of the thermostat 38 and its second position is towards the front. Likewise, the actuating arm 58 of the fresh food thermostat 40 moves between its first and second positions wherein its first position is towards the back of the thermostat 40 and its second position is towards the front.

The present invention includes a locking mechanism 100 situated between the two thermostats 38,40. The locking mechanism 100 includes a bell crank 102 having first and second arms 104,106 rigidly joined together at an angle. The bell crank 102 is mounted to pivot about the apex of the two arms. The distal end of the first arm 104 is connected to the actuating arm 48 of the freezer thermostat 38, and the distal end of the second arm 106 is pivotally connected to one end of a linking arm 108. The arrangement is such that rotation of the bell crank 102 will cause the linking arm 108 to move linearly along its longitudinal axis. The other end of the linking arm 108 is situated near the actuating arm 58 of the fresh food thermostat 40 and is provided with a ratchet tooth or hook 110. The linking arm 108 is biased by a spring 112 toward an abutment 114 so that the hook 110 is normally held in a position adjacent to the actuating arm 58 when the actuating arm 58 is in its second position.

FIG. 3 shows the arrangement when the temperature in the freezer compartment 14 is below the preset temperature level. The freezer actuating arm 48 is in its first position and the refrigeration system and evaporator fan 30 are thus not operating. With the actuating arm 48 in its first position, the locking mechanism 100 is such that the hook 110 on the linking arm 108 is situated adjacent to the fresh food actuating arm 58 on the side nearest the freezer thermostat 38. As can be seen in FIG. 3, the fresh food actuating arm 58 can freely move between its first and second positions (the first position is shown in dotted line and the second position is shown in solid line) as dictated by the temperature in the fresh food compartment 16. The movement of the actuating arm 58 will cause the damper 34 to open or close.

When the freezer temperature exceeds the preset temperature level, the freezer actuating arm 48 will switch to its second position as shown in FIG. 4. In addition to activating the compressor 20 and evaporator fan 30, this will cause the bell crank 102 to rotate clockwise. The bell crank 102 will in turn cause the linking arm 108 to move along its longitudinal axis such that the hook 110 moves to a position, referred to herein as the "locking position," on the side of the fresh food actuating arm 58 away from the freezer thermostat 38. The linking arm 108 and the hook 110 are able to move into the locking position regardless of the position of fresh food actuating arm 58. If the actuating arm 58 is in its first position (shown in dotted line in FIG. 4), the linking arm 108 and the hook 110 will move directly into the locking position. But if the actuating arm 58 is in its second position (shown in solid line in FIG. 4), it will block the path of the hook 110. However, upon engaging the actuating arm 58, the sloped configuration of the ratchet hook 110 will cause the linking arm 108 to rotate counterclockwise against the bias of the spring 112 so that the linking arm 108 can move into the locking position.

With the linking arm 108 in the locking position, the fresh food actuating arm 58 is still free to move between its first and second positions. When the actuating arm 58 is in its second position (indicating that the fresh food compartment 16 requires cooling), the hook 110 will catch the actuating arm 58 and prevent the linking arm 108 from moving from the locking position. The freezer actuating arm 48 will thus be prevented from moving back to its first position when the freezer temperature falls below the preset temperature level. The compressor 20 and evaporator fan 30 will thus continue to run until the fresh food compartment 16 is sufficiently cooled and the actuating arm 58 returns to its first position.

Thus, while only the freezer thermostat 38 can activate the compressor 20 and evaporator fan 30 (thereby preventing extraneous system operation to satisfy the fresh food load), either the freezer thermostat 38 or the fresh food thermostat 40 can inactivate the compressor 20 and evaporator fan 30. Under this arrangement, the system continues operating after the freezer load is satisfied if the fresh food load is not satisfied. Furthermore, the present invention is able to accommodate fresh food door opening transients without compressor operation because the damper 34 is operated by the fresh food thermostat 40 independently of the refrigeration system. And since air from the fresh food compartment 16 only flows through the return duct 36 while the evaporator fan 30 is running, fresh food return air flows into the freezer compartment 14 only while the refrigeration system is operating. This reduces ice cube fusing.

Figure 5:
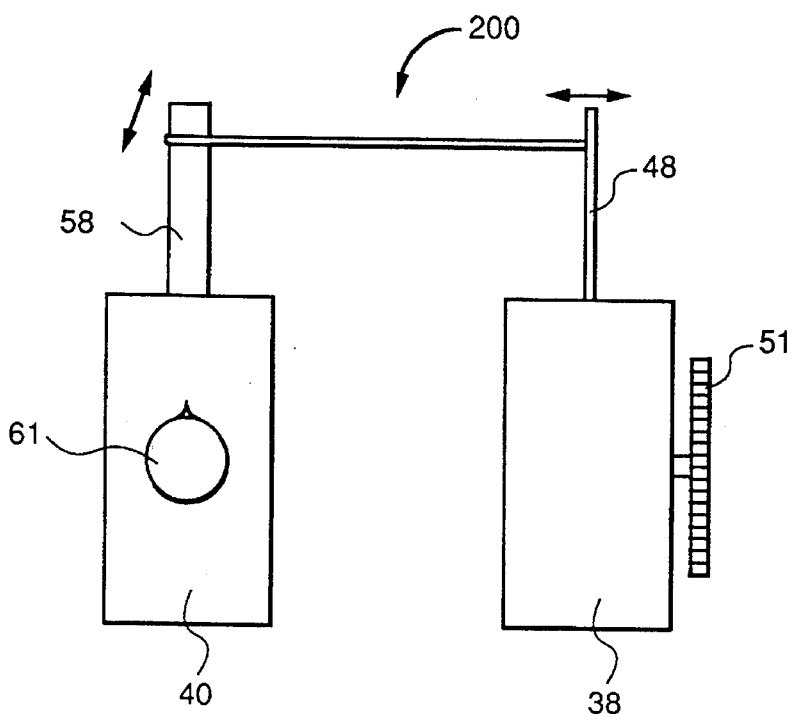
FIG. 5 shows a second embodiment of the refrigerator control in accordance with the present invention.
Figures 6, 7:
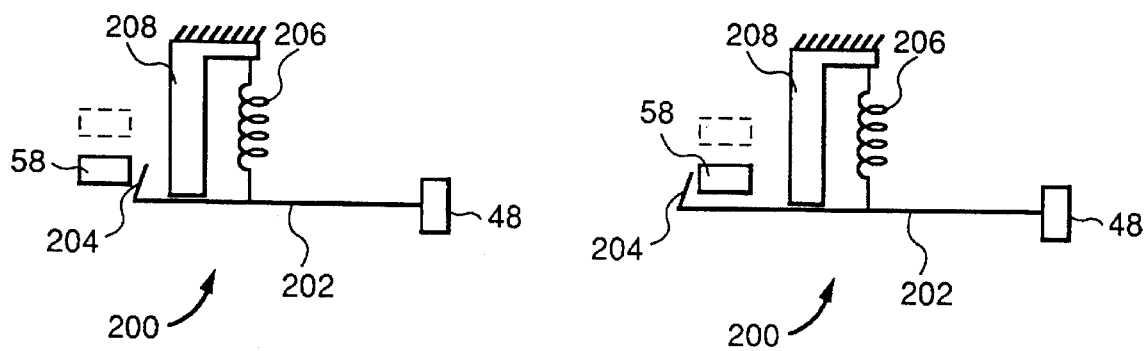
FIGS. 6 and 7 are top views of the embodiment of FIG. 5 illustrating the operation thereof.

Turning to FIGS. 5–7, a second embodiment of the refrigerator control of the present invention is shown. As seen best in FIG. 5, the freezer thermostat 38 and the fresh food thermostat 40 are arranged adjacent to one another with the freezer thermostat 38 turned 90 degrees with respect to the fresh food thermostat 40. Accordingly the freezer thermostat control knob 51 is a thumb wheel. The actuating arm 48 of the freezer thermostat 38 moves between the first and second positions in the direction shown by the arrows wherein its first position is towards the front of the thermostat 38 (to the right in FIG. 5) and its second position is towards the back (to the left in FIG. 5). Likewise, the actuating arm 58 of the fresh food thermostat 40 moves between its first and second positions wherein its first position is towards the back of the thermostat 40 and its second position is towards the front.

The present invention includes a locking mechanism 200 situated between the two thermostats 38,40. The locking mechanism 200 includes a linking arm 202 being pivotally connected at one end to the freezer actuating arm 48. The arrangement is such that motion of the actuating arm 48 will cause the linking arm 202 to move linearly along its longitudinal axis. The other end of the linking arm 202 is situated near the actuating arm 58 of the fresh food thermostat 40 and is provided with a ratchet tooth or hook 204. The linking arm 202 is biased by a spring 206 toward an abutment 208 so that the hook 204 is normally held in a position adjacent to the actuating arm 58 when the actuating arm 58 is in its second position.

FIG. 6 shows the arrangement when the temperature in the freezer compartment 14 is below the preset temperature level. The freezer actuating arm 48 is in its first position and the refrigeration system and evaporator fan 30 are thus not operating. With the actuating arm 48 in its first position, the hook 204 on the linking arm 202 is situated adjacent to the fresh food actuating arm 58 on the side nearest the freezer thermostat 38. As can be seen in FIG. 6, the fresh food actuating arm 58 can freely move between its first and second positions (the first position is shown in dotted line and the second position is shown in solid line) as dictated by the temperature in the fresh food compartment 16. The movement of the actuating arm 58 will cause the damper 34 to open or close.

When the freezer temperature exceeds the preset temperature level, the freezer actuating arm 48 will switch to its second position as shown in FIG. 7. In addition to activating the compressor 20 and evaporator fan 30, this will cause the linking arm 202 to move along its longitudinal axis such that the hook 204 moves to a position, referred to herein as the "locking position," on the side of the fresh food actuating arm 58 away from the freezer thermostat 38. The linking arm 202 and the hook 204 are able to move into the locking position regardless of the position of fresh food actuating arm 58. If the actuating arm 58 is in its first position (shown in dotted line in FIG. 7), the linking arm 202 and the hook 204 will move directly into the locking position. But if the actuating arm 58 is in its second position (shown in solid line in FIG. 7), it will block the path of the hook 204. However, upon engaging the actuating arm 58, the sloped configuration of the ratchet hook 204 will cause the linking arm 202 to rotate counterclockwise against the bias of the spring 206 so that the linking arm 202 can move into the locking position.

With the linking arm 202 in the locking position, the fresh food actuating arm 58 is still free to move between its first and second positions. When the actuating arm 58 is in its second position (indicating that the fresh food compartment 16 requires cooling), the hook 204 will catch the actuating arm 58 and prevent the linking arm 202 from moving from the locking position. The freezer actuating arm 48 will thus be prevented from moving back to its first position when the freezer temperature falls below the preset temperature level. The compressor 20 and evaporator fan 30 will thus continue to run until the fresh food compartment 16 is sufficiently cooled and the actuating arm 58 returns to its first position. Thus, as with the first embodiment, only the freezer thermostat 38 can activate the compressor 20 and evaporator fan 30, but either the freezer thermostat 38 or the fresh food thermostat 40 can inactivate the compressor 20 and evaporator fan 30.

Figure 8:
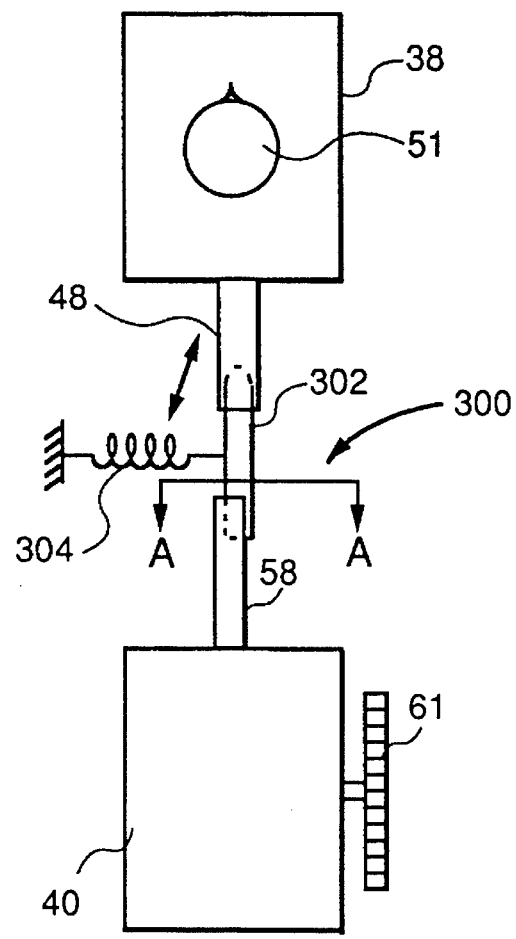
FIG. 8 shows a first embodiment of the refrigerator control in accordance with the present invention.
Figure 9:
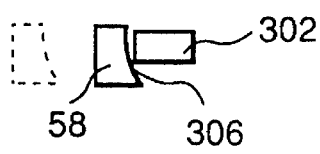
FIGS. 9 and 10 are top views of the embodiment of FIG. 8 (taken along line A—A of FIG. 8) illustrating the operation thereof.
Figure 10:
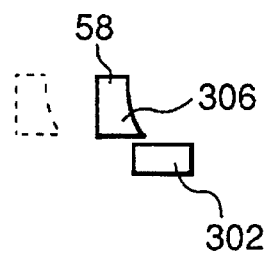

Turning to FIGS. 8–10, a third embodiment of the refrigerator control of the present invention is shown. As seen best in FIG. 8, the freezer thermostat 38 is situated directly above the fresh food thermostat 40 with the fresh food thermostat 40 turned 90 degrees with respect to the freezer thermostat 38. Accordingly the fresh food thermostat control knob 61 is a thumb wheel. The actuating arm 48 of the freezer thermostat 38 moves between the first and second positions in the direction shown by the arrows wherein its first position is towards the back of the thermostat 38 and its second position is towards the front. Likewise, the actuating arm 58 of the fresh food thermostat 40 moves between its first and second positions wherein its first position is towards the back of the thermostat 40 (to the left in FIG. 8) and its second position is towards the front (to the right in FIG. 8).

The present invention includes a locking mechanism 300 situated between the two thermostats 38,40. The locking mechanism 300 includes a linking arm 302 being pivotally connected at one end to the freezer actuating arm 48 so as to pivot about an axis which is parallel to the direction in which the actuating arm 48 moves. The linking arm 302 is biased clockwise by a spring 304 into a position in which the linking arm 302 extends lengthwise from the actuating arm 48. From the position, the linking arm 302 is able to pivot counterclockwise but is prevented from pivoting clockwise. The arrangement is such that displacement of the actuating arm 48 will cause the linking arm 302 to be displaced in the same direction. The other end of the linking arm 302 is situated near the actuating arm 58 of the fresh food thermostat 40. As best shown in FIGS. 9 and 10, the side of the actuating arm 58 nearest to the linking arm 302 has a ratchet tooth 306 formed thereon.

FIG. 9 shows the arrangement when the temperature in the freezer compartment 14 is below the preset temperature level. The freezer actuating arm 48 is in its first position and the refrigeration system and evaporator fan 30 are thus not operating. With the actuating arm 48 in its first position, the linking arm 302 is situated adjacent to the sloped surface of the ratchet tooth 306 on the fresh food actuating arm 58. As can be seen in FIG. 9, the fresh food actuating arm 58 can freely move between its first and second positions (the first position is shown in dotted line and the second position is shown in solid line) as dictated by the temperature in the fresh food compartment 16. The movement of the actuating arm 58 will cause the damper 34 to open or close.

When the freezer temperature exceeds the preset temperature level, the freezer actuating arm 48 will switch to its second position. In addition to activating the compressor 20 and evaporator fan 30, this will cause the linking arm 302 to move to a position, shown in FIG. 10 and referred to herein as the "locking position," adjacent to the flat surface of the ratchet tooth 306 on the actuating arm 58. The linking arm 302 is able to move into the locking position regardless of the position of fresh food actuating arm 58. If the actuating arm 58 is in its first position (shown in dotted line in FIG. 10), the linking arm 302 will move directly into the locking position. But if the actuating arm 58 is in its second position (shown in solid line in FIG. 10), it will block the path of the linking arm 302. However, upon engaging the actuating arm 58, the sloped configuration of the ratchet hook 306 will cause the linking arm 302 to rotate counterclockwise against the bias of the spring 304 so that the linking arm 302 can move into the locking position.

With the linking arm 302 in the locking position, the fresh food actuating arm 58 is still free to move between its first and second positions. When the actuating arm 58 is in its second position (indicating that the fresh food compartment 16 requires cooling), the flat surface of the ratchet tooth 306 will prevent the linking arm 302 from moving from the locking position. The freezer actuating arm 48 will thus be prevented from moving back to its first position when the freezer temperature falls below the preset temperature level. The compressor 20 and evaporator fan 30 will thus continue to run until the fresh food compartment 16 is sufficiently cooled and the actuating arm 58 returns to its first position. As with the prior embodiments, only the freezer thermostat 38 can activate the compressor 20 and evaporator fan 30, but either the freezer thermostat 38 or the fresh food thermostat 40 can inactivate the compressor 20 and evaporator fan 30.

The present invention encompasses any operative coupling between the thermostats which prevents the freezer thermostat from switching off while the fresh food thermostat is on. For instance, one equivalent locking mechanism could include a linking arm pivotally connected to the fresh food actuating arm and hooking the freezer actuating arm when both actuating arms are in their second positions.

The foregoing has described independently controlling the temperatures in the freezer and fresh food compartments of a refrigerator in an energy efficient manner. While specific embodiments of the present invention have been described, it will be apparent to those skilled in the art that various modifications thereto can be made without departing from the spirit and scope of the invention as defined in the appended claims.

What is claimed is:

1. A control for a refrigeration apparatus having first and second cooled compartments, a compressor and an evaporator fan, said control comprising:

a first thermostat having first and second states, said first thermostat changing from its first state to its second state when the temperature in said first compartment exceeds a predetermined level;

a second thermostat having first and second states, said second thermostat changing from its first state to its second state when the temperature in said second compartment exceeds a predetermined level; and a locking mechanism situated between said first and second thermostats so that said first thermostat is prevented from changing from its second state to its first state whenever said second thermostat is in its second state.

2. The control of claim 1 wherein said compressor and said evaporator fan are activated when said first thermostat is in its second state.

3. The control of claim 1 wherein the refrigeration apparatus further includes a damper which is opened whenever said second thermostat is in its second state.

4. A refrigeration apparatus comprising:

a freezer compartment;

a fresh food compartment;

a first thermostat having a temperature sensing element situated in said freezer compartment and a first actuating arm which moves from a first position to a second position when the temperature in said freezer compartment exceeds a predetermined level;

a second thermostat having a temperature sensing element situated in said fresh food compartment and a second actuating arm which moves from a first position to a second position when the temperature in said fresh food compartment exceeds a predetermined level; and a locking mechanism situated between said first and second actuating arms so that said first actuating arm is prevented from moving into its first position when said second actuating arm is in its second position.

5. The refrigeration apparatus of claim 4 further comprising a compressor and an evaporator fan situated in said freezer compartment for circulating air within said freezer compartment and through said air passage, said compressor and said evaporator fan being activated when said first actuating arm is in its second position.

6. The refrigeration apparatus of claim 4 further comprising an air passage between said freezer compartment and said fresh food compartment and a damper situated in said air passage, said damper being opened when said second actuating arm is in its second position.

7. The refrigeration apparatus of claim 4 wherein said locking mechanism comprises a linking arm attached to said first actuating arm.

8. The refrigeration apparatus of claim 7 wherein said linking arm is allowed to pivot with respect to said first actuating arm.

9. The refrigeration apparatus of claim 8 wherein said linking arm is spring biased toward a position adjacent to said second actuating arm.

10. The refrigeration apparatus of claim 7 further comprising and a hook attached to said linking arm.

11. The refrigeration apparatus of claim 7 wherein said linking arm is attached to said first actuating arm via a bell crank.

12. The refrigeration apparatus of claim 7 wherein said second actuating arm has a ratchet tooth formed thereon.

13. The refrigeration apparatus of claim 4 wherein said locking mechanism comprises a linking arm attached to said second actuating arm.

14. A refrigeration apparatus comprising:

a freezer compartment;

a fresh food compartment;

a first thermostat having a temperature sensing element situated in said freezer compartment and a first actuating arm which moves from a first position to a second position when the temperature in said freezer compartment exceeds a predetermined level;

a second thermostat having a temperature sensing element situated in said fresh food compartment and a second actuating arm which moves from a first position to a second position when the temperature in said fresh food compartment exceeds a predetermined level;

a linking arm having one end attached to one of said first and second actuating arms and another end situated adjacent to the other of said first and second actuating arms.

15. The refrigeration apparatus of claim 14 further comprising a compressor and an evaporator fan situated in said freezer compartment for circulating air within said freezer compartment and through said air passage, said compressor and said evaporator fan being activated when said first actuating arm is in its second position.

16. The refrigeration apparatus of claim 14 further comprising an air passage between said freezer compartment and said fresh food compartment and a damper situated in said air passage, said damper being opened when said second actuating arm is in its second position.

17. The refrigeration apparatus of claim 14 wherein said linking arm is allowed to pivot with respect to said one actuating arm.

18. The refrigeration apparatus of claim 17 wherein said linking arm is spring biased towards said other actuating arm.

19. The refrigeration apparatus of claim 14 further comprising and a hook attached to said linking arm.

20. The refrigeration apparatus of claim 14 wherein said linking arm is attached to said one actuating arm via a bell crank.

21. The refrigeration apparatus of claim 14 wherein said other actuating arm has a ratchet tooth formed thereon.

22. A control for a refrigeration apparatus having first and second cooled compartments and a compressor, said control comprising:

a first thermostat responsive to the temperature of said first compartment, said first thermostat being arranged to activate and inactivate said compressor;

means for preventing said first thermostat from inactivating said compressor whenever the temperature of said second compartment exceeds a predetermined level; and said means for preventing includes a second thermostat responsive to the temperature of said second compartment and a locking mechanism situated between said first and second thermostats.

\* \* \* \* \*